No. 761,859. PATENTED JUNE 7, 1904.
F. E. SWEET.
LOCKING SNAP.
APPLICATION FILED APR. 7, 1903.
NO MODEL.

Witnesses:

Inventor:
Frank E. Sweet,
By Thomas F. Sheridan,
Att'y

No. 761,859. Patented June 7, 1904.

UNITED STATES PATENT OFFICE.

FRANK E. SWEET, OF CARBONDALE, COLORADO.

LOCKING-SNAP.

SPECIFICATION forming part of Letters Patent No. 761,859, dated June 7, 1904.

Application filed April 7, 1903. Serial No. 151,431. (No model.)

*To all whom it may concern:*

Be it known that I, FRANK E. SWEET, a citizen of the United States, residing at Carbondale, in the county of Garfield, and in the State of Colorado, am the inventor of certain new and useful Improvements in Locking-Snaps, of which the following is a specification.

My invention relates to that class of snaps having a main body portion comprising a shell and hook provided with an opening therebetween, a bolt removably mounted in the casing extending removably across such opening when in closed position, and means for locking such bolt in closed position.

It relates, further and particularly, to a locking-snap having a body portion comprising a casing and an integral rigid hook on one end thereof provided with an opening therebetween, a bolt slidably mounted in such casing, means for automatically moving such bolt into closed position across such opening so as to inclose the same, and means for locking such bolt in closed position.

The principal object of my invention is to provide a simple, economical, and efficient locking-snap.

A further object of the invention is to provide a lock mechanism adapted to perform the functions of a snap for securely hitching horses or other animals and which may be used as a padlock.

Other and further objects of the invention will appear from an examination of the drawings and the following description and claims.

The invention consists in the features, combinations, and details of construction hereinafter described and claimed.

Figure 1:
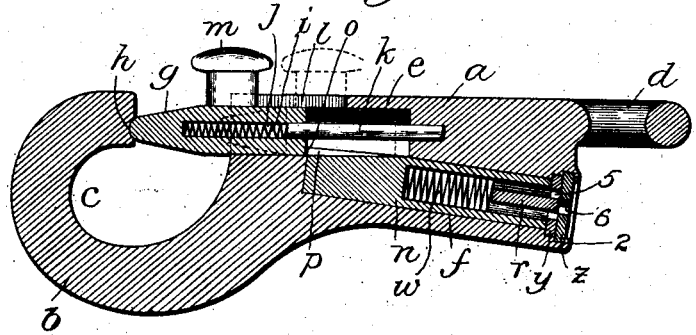
Figure 2:
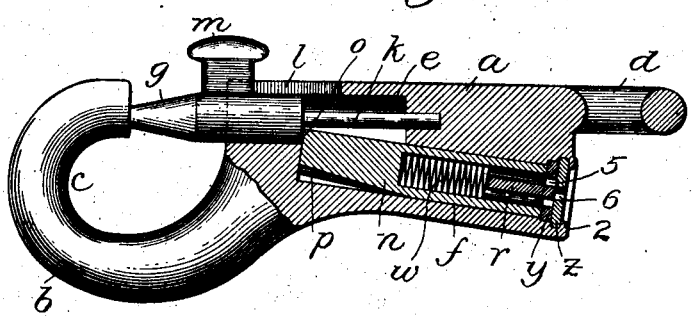
Figure 3:
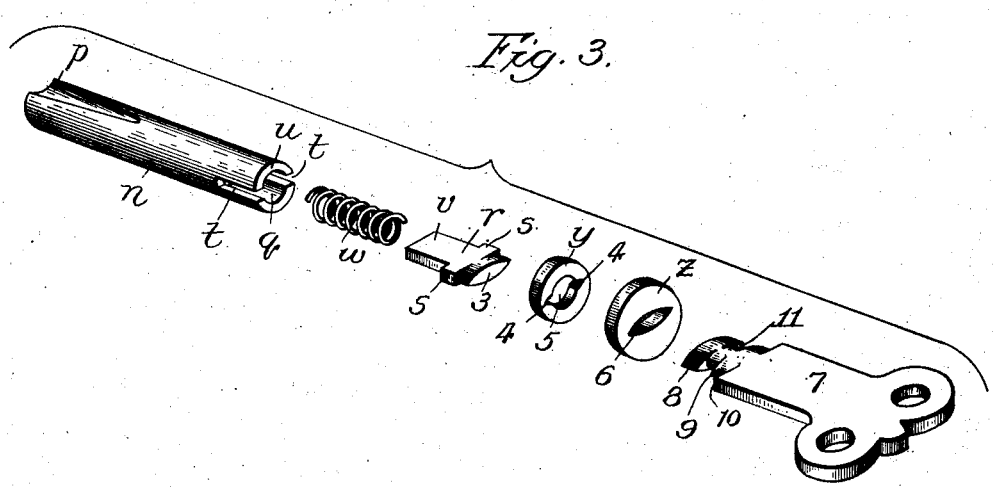

In the accompanying drawings, Figure 1 is a longitudinal sectional view of a locking-snap constructed in accordance with my improvements, showing the securing-bolt in closed but in unlocked position; Fig. 2, a similar view showing the securing-bolt in closed locked position; and Fig. 3 is a perspective view of the rotatable locking-tumbler with its operating-dog, spring, guard, and key mechanism.

In constructing a locking-snap in accordance with my improvements I provide a main body portion comprising a shell or casing $a$, having an integral rigid hook $b$ at one end thereof, forming an opening $c$ between such hook and shell portions, and an integral loop $d$ at the opposite end thereof adapted to be secured to a chain, rein, or other object. The shell portion of the main body of the device is provided with converging bores $e$ and $f$, in the first of which is slidably mounted a securing-bolt $g$, adapted to extend across the opening between the shell and hook portion and into engagement with the end of the hook, resting, preferably, in a slot $h$ in the end of the hook. The bolt is then in what I term its "closed" position, from which it is adapted to be readily moved backward into the position shown in dotted lines in Fig. 1 or open position, so as to leave the slot between the hook and shell portion of the device free to admit or permit the removal of the staple or other article to be locked or secured.

In order to automatically throw the above-described bolt into closed position, it is provided either at its inner end or in an axial bore $i$, as shown in Fig. 1, with a spiral spring $j$, one end of which engages the bolt and the other end of which engages the end of a pin $k$, adapted to extend into the radial bore of the bolt. To permit the bolt to be readily moved into open position, the bolt $e$ is provided with a longitudinal slot $l$, and a stud $m$ is mounted in the bolt, so as to extend through such longitudinal slot and in sliding engagement with the walls thereof.

It will be readily understood by those skilled in the art that the spiral spring may be mounted at the extreme inner end of the bolt, if desired, without departing from the spirit of my invention.

In order to lock the above-described bolt in closed position, a locking-tumbler $n$ is rotatably mounted in the slot $f$, so that its inner end extends when in locked position into engagement with the shoulder $o$ of the securing-bolt and out of engagement therewith when in unlocking position, such inner end being provided with an inclined slot $p$ on one side thereof, extending longitudinally of the tumbler at an angle to its axial center, so as to permit the securing-bolt to slide therethrough when the tumbler is in unlocking position.

In order to secure the locking-tumbler in operative position and provide means for enabling it to be operated by means of a suitable key, as well as to prevent it from being operated by any one not having possession of the key, such tumbler is provided with an axial bore $q$, in which is mounted an operating-dog $r$, provided with shoulders $s$, adapted to extend into slots $t$ in the outer end $u$ of the locking-tumbler, the inner end $u$ of such dog being of a suitable size to permit it to slide or rotate readily in the axial bore of the tumbler and of sufficient length to extend into such bore beyond the longitudinal slots on each side thereof. A spiral spring $w$ is mounted in the axial bore of the tumbler in engagement with the operating-dog, so as to normally hold such dog in its outer position and permit it to be moved inwardly against the tension of the spring by pressure of the proper key thereon.

A suitable guard $y$ is mounted, preferably, rigidly in the casing in engagement with the outer end of the locking-tumbler, and a second guard $z$ is mounted, preferably, rotatably outside of such guard in sliding engagement therewith. The outer guard is held, preferably, rotatably in position by means of an inwardly-projecting ream or bead 2 on the shell or casing of the devices. The outer end of the operating-dog is provided with a longitudinally-projecting portion 3 of smaller area than the shouldered portion of such dog and adapted to extend into notches 4 in the inner guard when the dog is in its outer position and be freed from such notches by means of the proper key when the guard is pressed inward, thus permitting the tumbler to be turned into either locking or unlocking position by the key. By this arrangement it will be readily seen that when the tumbler is turned into locking position and the dog permitted to enter the notches of the fixed guard the tumbler will be locked in such position, and when turned into unlocking position and the projecting end of the dog permitted to enter the notches of such guard the tumbler will be locked in that position, and that it can only be moved into or out of either of such positions by means of a proper key adapted to extend through the notches and central perforation 5 of the fixed guard.

The outer guard, which, as before stated, I prefer to mount rotatably, is also provided with an elongated central perforation 6, adapted to permit the insertion of a suitable key through such guard into position to turn the locking-tumbler. A suitable key 7 is then provided, having shouldered end portions 8 adapted to enter the notches of the fixed guard and be inserted into the notches $t$ of the rotatable tumbler. The key is also provided with a second pair of shoulders 9, adapted to fit the slot of the rotatable guard, and with shoulders 10 of such dimensions as to prevent their entrance into the perforation of the outer guard.

A central connecting body portion 11 connects the shouldered portions of the key above described and is of such size as to permit it to readily rotate inside the perforation 5 of the fixed guard.

In a device constructed as above described and shown it will be readily understood that the securing-bolt is automatically thrown into securing position by its spiral spring and may be readily locked in such position by the introduction of the proper key to operate the rotatable tumbler, but cannot be either locked or unlocked without a key having a shouldered or slotted end portion of similar contour to the notches in the fixed guard at the end of the locking-tumbler. It will also be readily understood that these notches and the shoulders of the key may be made of any shape desired to afford the necessary safety and that more than one fixed guard may be employed, if desired, so as to secure and necessitate the use of a more complicated form of key.

A device constructed in accordance with my improvements as above described may be readily used as a snap for hitching-reins, so as to safely secure a horse or other animal without the necessity of tying the hitching-rein and may be locked when used in such a capacity to more perfectly secure the animal from becoming untied, either accidentally or otherwise, except by the person in possession of the proper key. The device is also capable of being employed in the capacity of a padlock and is very simple and economical of construction and efficient in operation. The casing and hook being preferably integral possesses the advantages of great strength, as well as simplicity and cheapness of construction.

I claim—

1. In mechanisms of the class described, the combination of a body portion comprising a casing and a hook provided with an opening therebetween, a bolt movably mounted in the casing extending across such opening when in closed position, and a longitudinally-movable locking-pin mounted in such casing rotatable into and out of locking engagement with such bolt, substantially as described.

2. In mechanisms of the class described, the combination of a body portion comprising a casing and an integral rigid hook provided with an opening therebetween, a bolt slidably mounted in the casing extending across such opening when in closed position, means for automatically moving such bolt into closed position, and a locking-pin movable into and out of locking engagement with such bolt and provided with a slot for receiving and permitting the movement of the bolt when such locking-pin is out of locking position, substantially as described.

3. In mechanisms of the class described, the combination of a body portion comprising a casing and a hook provided with an opening therebetween, a bolt slidably mounted in the casing extending across such opening when in closed position, means for automatically moving such bolt into closed position, and a cylindrical tumbler-pin rotatably mounted in the casing in locking engagement with such bolt, and provided with a slot in one side of such pin for receiving and permitting the movement of the bolt when the locking-pin is out of locking position, substantially as described.

4. In mechanisms of the class described, the combination of a body portion provided with an open slot therein and forming walls of such slot, a bolt slidably mounted in such body portion extending across such slot when in closed position, and a cylindrical tumbler-pin rotatably mounted in oblique position with relation to and in locking engagement with such bolt, and provided with a slot for receiving and permitting the movement of the bolt when such tumbler-pin is out of locking position, substantially as described.

5. In mechanisms of the class described, the combination of a body portion provided with an open slot therein and forming the walls of such slot, a bolt slidably mounted in such body portion extending across such slot when in closed position, a cylindrical tumbler-pin rotatably mounted in locking engagement with such bolt and provided with an axial bore having longitudinal slots at one end thereof, an operating-dog yieldingly mounted in such slots, a fixed guard mounted at the slotted end of such rotatable tumbler, and means for rotating such tumbler, substantially as described.

6. In mechanisms of the class described, the combination of a body portion provided with an open slot therein and forming the walls of such slot, a bolt slidably mounted in such body portion extending across such slot when in closed position, a cylindrical tumbler-pin rotatably mounted in locking engagement with such bolt and provided with an axial bore having longitudinal slots at one end thereof, an operating-dog yieldingly mounted in such slots, a fixed guard mounted at the slotted end of such rotatable tumbler, provided with a perforation therethrough and a key provided at one end with a shoulder portion for engaging the slotted end of the rotatable tumbler, substantially as described.

7. In mechanisms of the class described, the combination of a body portion provided with an open slot therein and forming the walls of such slot, a bolt slidably mounted in such body portion extending across such slot when in closed position, a cylindrical tumbler-pin rotatably mounted in locking engagement with such bolt and provided with an axial bore having longitudinal slots at one end thereof, an operating-dog yieldingly mounted in such slots, a fixed guard mounted at the slotted end of such rotatable tumbler provided with a perforation therethrough, a guard mounted in sliding engagement with such fixed guard and provided with a perforation therethrough, and a key provided with a shouldered end body to enter the perforations of such guards and engage the slotted end of the tumbler-pin, substantially as described.

8. In mechanisms of the class described, the combination of a body portion comprising a casing provided with an integral rigid hook portion at one end thereof and having an opening therebetween and with a loop at the opposite end thereof, a bolt slidably mounted in such casing extending across the opening intermediate the hook and casing portions when in closed position, means for automatically moving the bolt into closed position, a tumbler-pin provided with an inclined groove at one end thereof and mounted in locking engagement with such bolt and provided at the opposite end with longitudinal slots for receiving a key, and a fixed guard mounted at the slotted end of such rotatable tumbler-pin and provided with a perforation therethrough, and key mechanism for operating such tumbler-pin, substantially as described.

FRANK E. SWEET.

Witnesses:
  E. D. TANDY,
  Z. B. KIGGINS.